United States Patent
Holler et al.

(10) Patent No.: US 9,643,119 B2
(45) Date of Patent: May 9, 2017

(54) SURFACE TREATMENT DEVICE AND METHOD FOR OPERATING A SURFACE TREATMENT DEVICE

(71) Applicant: Dürr Systems GmbH, Bietigheim-Bissingen (DE)

(72) Inventors: Sebastian Holler, Tamm (DE); Michael Baitinger, Marbach (DE); Dietmar Wieland, Waiblingen (DE); Wolfgang Tobisch, Stuttgart (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 58 days.

(21) Appl. No.: 14/434,054

(22) PCT Filed: Oct. 8, 2013

(86) PCT No.: PCT/EP2013/070969
§ 371 (c)(1),
(2) Date: Apr. 7, 2015

(87) PCT Pub. No.: WO2014/056933
PCT Pub. Date: Apr. 17, 2014

(65) Prior Publication Data
US 2015/0283492 A1     Oct. 8, 2015

(30) Foreign Application Priority Data
Oct. 11, 2012    (DE) .................... 20 2012 103 894 U

(51) Int. Cl.
*B05B 15/12*    (2006.01)
*B01D 53/04*    (2006.01)
*B01D 53/00*    (2006.01)

(52) U.S. Cl.
CPC .......... *B01D 53/04* (2013.01); *B05B 15/1233* (2013.01); *B05B 15/1248* (2013.01);
(Continued)

(58) Field of Classification Search
CPC ........ B01D 47/06; B01D 53/14; B01D 15/12; B01D 53/1487; B01D 53/1425; Y92P 70/36; B05B 5/025
(Continued)

(56) References Cited

U.S. PATENT DOCUMENTS 4,353,715 A * 10/1982 Mir ........................ B01D 47/06
                                                                210/651
4,537,120 A *  8/1985 Josefsson ............ B05B 15/1222
                                                                454/52
(Continued)

FOREIGN PATENT DOCUMENTS

DE    28 28 130    1/1980
DE    43 35 231    4/1995
(Continued)

*Primary Examiner* — Duane Smith
*Assistant Examiner* — Minh-Chau Pham
(74) *Attorney, Agent, or Firm* — Womble Carlyle Sandridge & Rice LLP

(57) ABSTRACT

In order to provide a surface treatment device for treating a surface of a workpiece which is operable simply and safely, it is proposed that the surface treatment device include the following: a work region in which the surface of the workpiece is treatable; a flow guiding device by means of which a gas stream is guidable through the work region; a solvent separating device for separating off solvent from the gas stream that is guided through the work region, wherein the solvent separating device is configured to be put selectively in a separating condition or in a rest condition, wherein, in the separating condition, the solvent separating device separates off solvent from the gas stream.

14 Claims, 8 Drawing Sheets

(52) U.S. Cl.
CPC .... *B01D 53/002* (2013.01); *B01D 2258/0258* (2013.01); *B01D 2259/40088* (2013.01)

(58) Field of Classification Search
USPC .... 95/37, 193, 189, 205; 118/631, 634, 312, 118/326; 55/463, DIG. 46; 96/234, 240; 210/651; 454/55
See application file for complete search history.

(56) References Cited

U.S. PATENT DOCUMENTS

| | | | |
|---|---|---|---|
| 4,750,412 A | | 6/1988 | Itou |
| 5,039,313 A | * | 8/1991 | Gocht ........................ B03C 3/16 55/DIG. 46 |
| 5,296,031 A | * | 3/1994 | Seiler .................... B05B 5/1683 118/312 |
| 6,497,751 B2 | * | 12/2002 | Yamauchi ........... B05B 15/1266 118/326 |
| 6,565,625 B2 | * | 5/2003 | Hearld ................. B01D 50/002 55/DIG. 46 |
| 2011/0132197 A1 | | 6/2011 | Nagase et al. |
| 2011/0226127 A1 | * | 9/2011 | Dingler .................. B03C 3/017 95/71 |

FOREIGN PATENT DOCUMENTS

| | | |
|---|---|---|
| DE | 199 39 032 | 10/2000 |
| DE | 10 2010 021 540 | 11/2011 |
| DE | 10 2010 030 280 | 12/2011 |
| DE | 10 2010 052 461 | 5/2012 |
| DE | 10 2011 051 405 | 1/2013 |
| EP | 0082016 | 6/1983 |

\* cited by examiner

SURFACE TREATMENT DEVICE AND METHOD FOR OPERATING A SURFACE TREATMENT DEVICE

CROSS-REFERENCE TO RELATED APPLICATIONS

The present application is a U.S. National Stage of International Patent Application PCT/EP2013/070969, filed Oct. 8, 2013, and claims priority to German Patent Application No. 20 2012 103 894.3, filed Oct. 11, 2012. The disclosures of each of the applications noted above are incorporated herein by reference in their entirety.

FIELD OF THE DISCLOSURE

The present invention relates to a surface treatment device for treating a surface of the workpiece.

BACKGROUND

DE 10 2010 052 461 A1 discloses a filter device which includes an adsorption filter unit and a thermal regeneration means.

SUMMARY OF THE INVENTION

The object of the present invention is to provide a surface treatment device which is for treating a surface of a workpiece and which is operable simply and safely.

According to the invention, this object is achieved by a surface treatment device for treating a surface of a workpiece which includes the following:
  a work region in which the surface of the workpiece is treatable;
  a flow guiding device by means of which a gas stream is guidable through the work region;
  a solvent separating device for separating off solvent from the gas stream that is guided through the work region, wherein the solvent separating device is configured to be put selectively in a separating condition or in a rest condition, wherein, in the separating condition, the solvent separating device separates off solvent from the gas stream.

Because the solvent separating device is configured to be put selectively in a separating condition or in a rest condition, it is possible for different operating conditions of the surface treatment device to be adopted quickly and simply. In particular, this enables a rest operation of the surface treatment device to be adopted quickly and simply. This makes it possible for a work region of the surface treatment device that has been contaminated by solvent in a treatment operation of the surface treatment device to be freed of solvents, preferably simply and safely, such that it is accessible to persons without any need to fear damage to health.

Selectively putting the solvent separating device in the separating condition or the rest condition is carried out in particular by a mechanical switching between the separating condition and the rest condition, for example by moving at least one solvent separating element and/or by switching over valves or flaps, and a flow deflection resulting therefrom. As an alternative or in addition to this, it may be provided for the solvent separating device to be configured to be put into the separating condition or the rest condition by electrical switching, in particular by being switched on and off.

Preferably, in the separating condition at least some of the gas stream that is guided through the to work region flows through the solvent separating device.

In the rest condition, preferably at least some of, and in particular all, the gas stream that is guided through the work region is guided past the solvent separating device.

In the rest condition of the solvent separating device, the separating power of the solvent separating device is preferably smaller than in the separating condition.

Preferably, in the rest condition of the solvent separating device a smaller quantity of solvent is separated off from the gas stream that is guided through the work region than in a separating condition.

In particular if the solvent separating device is in the rest condition, preferably no further separation, or only a small amount of further separation, of solvent from the gas stream that is guided through the work region is performed by means of another device.

In the rest condition of the solvent separating device, the latter is preferably in a standby condition, in particular such that it may if necessary be put into the separating condition more swiftly than from a switched-off condition.

In this description and the attached claims, the term "solvent" should be understood in particular as a substance which can dissolve or dilute gases, liquids or solids. A possible chemical interaction between the dissolved substance and the dissolving substance may intensify the action of the solvent.

In particular, it may be provided for the solvent to be paint solvent.

Solvent may be in vapour, aerosol and/or gaseous form.

A solvent is preferably a volatile substance which has a boiling point of less than 100° C. (at standard pressure).

In particular, a solvent is an organic solvent, for example a volatile organic compound (VOCs).

It may be advantageous if the gas stream is feedable again by means of the flow guiding device to the same work region and/or to a further work region of the surface treatment device. In this way, a circulating air operation and/or a cascade operation of the flow guiding device may be made possible.

The surface treatment device preferably includes a particle separating device which takes the form of a regenerable filter device, for separating off particles from a gas stream that is guided through a work region and is loaded with particles.

Particles are in particular coating overspray particles and/or droplets of coating overspray, which occurs in particular in a coating device.

The term "regenerable filter device" should be understood as a dividing device for dividing off contaminants from a gas stream that is guided through a coating device, in particular for dividing off coating overspray from a raw gas stream that contains overspray particles, in which separated contaminants may be cleaned off without having to exchange filter elements of the filter device.

The term "regenerable filter device" should in particular also be understood as a filter device which has one or more dry filter elements and/or dry dividing devices in which a gas stream is cleaned substantially without the addition of a liquid to the filter elements. Independently of this, downstream or upstream cleaning stages may in turn also be provided, using solvents or cleaning agents which (in standard conditions) are liquid.

With a regenerable filter device, it may further be provided for the filter device to include at least one filter element which, in the filtering operation, is provided with a barrier layer or a protective layer that includes auxiliary filter material, in particular powdered limestone.

In this way, during the filtering operation of the filter device it is possible to prevent the filter element from becoming clogged with contaminants from the gas stream fed to the filter device.

Cleaning off the barrier layer or protective layer of the filter element of the filter device enables particularly simple regeneration of the filter element, which is subsequently usable again by applying a fresh barrier layer or protective layer.

Possible coatings are in particular a powder coating or fluid coating. Here, the term "fluid coating" designates—by contrast with the term "powder coating"—a coating having a flowable consistency, from liquid to pasty (for example in the case of a PVC plastisol). The term "fluid coating" includes in particular the terms "liquid coating" and "wet coating".

When fluid coating is used, the coating overspray from a coating device is thus a fluid coating overspray, and when wet coating is used it is a wet coating overspray.

Preferably, the solvent separating device is a device that is different from the particle separating device. Preferably, the solvent separating device is provided in addition to a particle separating device.

The gas stream that is guided through the work region is feedable preferably first to the particle separating device and at the same time is in particular cleanable by means of the latter, and is then selectively cleanable by means of the solvent separating device or is guidable past the latter without being cleaned, or is guidable through the latter without being cleaned.

It may be advantageous if the surface treatment device includes an intake air device by means of which an intake air stream is feedable to the flow guiding device.

An intake air stream is in particular a gas stream of fresh air, in particular ambient air, air in the shop, etc. However, an intake air stream may also be fed in from a work region of the surface treatment device. An intake air stream of fresh air is preferably loaded with fewer particles or less solvent than an intake air stream which is fed in from a work region of the surface treatment device.

The term "treatment operation" should in particular be understood to be a coating operation in which workpieces are coated, a drying operation in which workpieces are dried and/or a monitoring operation in which workpieces are monitored and/or post-treated.

It may be advantageous if the surface treatment device includes an exhaust air device by means of which a stream of exhaust air is guidable away out of the flow guiding device.

In particular, it may be provided for some of a gas stream that is guided in a circular flow, that is to say a circulating air stream, to be configured to be branched off and guided away by means of the exhaust air device.

A volume of flow of the intake air stream preferably corresponds substantially to a volume of flow of the exhaust air stream.

Preferably, the volume of flow of the intake air stream is at most approximately 30%, in particular at most approximately 20%, for example at most approximately 10%, of the volume of flow of the gas stream guided through the work region.

Further, the volume of flow of the exhaust air stream is preferably at most approximately 30%, in particular at most approximately 20%, for example at most approximately 10%, of the volume of flow of the gas stream guided through the work region.

The gas stream guided through the work region is preferably guided in a circular flow as a circulating air stream.

By means of an intake air device of the surface treatment device, an intake air stream is preferably feedable to the flow guiding device, wherein preferably solvent is separable from the intake air stream and/or releasable into the intake air stream by means of the solvent separating device.

In particular, it may be provided for solvent from the intake air stream to be separable from the intake air stream and/or releasable into the intake air stream in the rest condition of the solvent separating device.

In an embodiment of the invention, it may be provided for the intake air stream to be guidable selectively through the solvent separating device or past the solvent separating device and then to be feedable, together with at least some of a gas stream that has already been guided through the work region previously, to the same work region again and/or to a further work region of the surface treatment device.

The portion of the gas stream that has already been guided through the work region previously is preferably guidable through the solvent separating device if the intake air stream is guidable past the solvent separating device for the purpose of avoiding a separation of solvent.

Further, it may be provided for the portion of gas stream that has already been guided through the work region previously to be guidable past the solvent separating device if the intake air stream is guidable through the solvent separating device for the purpose of separating or releasing solvent.

In an embodiment of the invention, it is provided for the surface treatment device to include a control device by means of which the surface treatment device is selectively operable in a treatment operation, in which workpieces are treated, or in a rest operation, in which no workpieces are treated.

In the treatment operation of the surface treatment device, the solvent separating device is preferably in the rest condition.

In the rest condition of the surface treatment device, the solvent separating device is preferably in the separating condition, that is to say the solvent separating device separates solvent off from the gas stream that is guided through the work region.

It may be advantageous if the solvent separating device is a solvent temporary storage device by means of which solvent which, in a treatment operation of the surface treatment device, is contained in a gas stream that is to be fed to a work region is separable from the gas stream in a rest condition of the surface treatment device.

In this case, in particular it may be provided for solvent to be separable, in particular adsorbable, from a circulating air stream that is guided through the work region. In this way, a concentration of solvent in the gas stream that flows through the work region may be reduced simply and safely. The work region may then preferably be accessed by persons without any need to fear that the persons' health will be adversely affected by solvents that are present.

Further, it may be provided for the solvent separating device to be a solvent temporary storage device by means of which solvent which, in a rest operation of the surface treatment device, is taken up in the solvent separating device is releasable into a gas stream that is to be fed to a work region in a treatment operation of the surface treatment device.

In particular, it may be provided for solvent to be releasable, in particular desorbable, into a circulating air stream that is guided through the work region. In particular, in this case the solvent separating device may be flushed, for example by an intake air stream, in order to release solvent that has been taken up in the solvent separating device.

Preferably, in the case of at least partial circulating air motion, an operating condition of the surface treatment device may be re-established more quickly by means of a solvent temporary storage device for performing the treatment operation than if the intake air is at least partly fresh air. As the proportion of circulating air increases, the proportion of fresh air to be conditioned before it is fed in falls.

Preferably, a solvent separating device includes a sorption device, for example an absorption device.

In particular, it may be provided for the solvent separating device to include an adsorption device for the adsorption of solvent, a condensation device for condensing out solvent and/or a combustion device for the thermal conversion of solvent.

For example, it may be provided for the solvent separating device to include an adsorbing agent cleaning system.

It may be provided for the solvent separating device to include an activated charcoal material and/or a zeolite material for separating off solvent.

In particular, it may be provided for the solvent separating device to include an activated charcoal bulk material and/or a zeolite bulk material for separating off solvent.

The term "zeolite material" should be understood in particular as a material which contains constituents belonging to the zeolite group in mineralogy, or which is formed entirely by a material which belongs to the zeolite group in mineralogy.

Materials in the zeolite group are characterised in particular by the following composition:

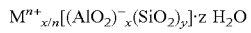

$$M^{n+}{}_{x/n}[(AlO_2)^-{}_x(SiO_2)_y]\cdot z\, H_2O$$

Zeolites are in particular crystalline aluminosilicates of natural or synthetic origin.

In an embodiment of the invention, it is provided for the solvent separating device to include at least one filter element which includes an activated charcoal material. Preferably, at least one activated charcoal element may be integrated into the at least one filter element. This may preferably reduce or prevent the creation of dust.

A combustion device may in particular be a catalytic oxidation device. This may ensure that less heat is generated.

If the solvent separating device includes a combustion device, the term "separation" also includes "combustion".

The work region of the surface treatment device to which a gas stream is feedable by means of the flow guiding device is a coating region, a drying region and/or a monitoring region for coating, drying, monitoring and/or post-treating workpieces.

It may be provided for the surface treatment device to include a conditioning device by means of which an intake air stream and/or a gas stream that is guided through a work region are conditionable before being fed to a work region.

In particular, it may be provided for the intake air stream and/or the gas stream to be conditionable in respect of air humidity and/or temperature.

Preferably, the conditioning device includes a heat exchanger, a humidifying device, a dehumidifying device, a ventilator, a heating device and/or a cooling device.

The solvent separating device is preferably arranged upstream or downstream of the conditioning device.

The surface treatment device according to the invention includes in particular a coating plant and/or a drying plant for coating and/or drying vehicle bodies.

Further, it may be provided for the surface treatment device to take the form of a coating plant and/or drying plant.

The present invention further relates to a method for operating a surface treatment device.

In this respect, the object of the invention is to provide a method by means of which a surface treatment device is operable simply and safely.

According to the invention, this object is achieved by a method for operating a surface treatment device in which:
  a surface of a workpiece is treated in a work region of the surface treatment device;
  a gas stream is guided through the work region;
  a solvent separating device for separating solvent off from the gas stream that is guided through the work region is selectively put in a separating condition or in a rest condition, wherein, in the separating condition, the solvent separating device separates off solvent from the gas stream.

Because, in the method according to the invention, the solvent separating device is selectively put in a separating condition or a rest condition, the surface treatment device may be operated simply and safely. In particular, as a result of this a treatment operation of the surface treatment device or a rest operation of the surface treatment device may selectively be adopted in a particularly simple manner.

It may be advantageous if the gas stream that is guided through the work region is fed again to the same work region or to a further work region of the surface treatment device.

In particular, it may be provided for an intake air stream selectively to be cleaned by means of the solvent separating device and then, together with at least a portion of a gas stream that has already been guided previously through the work region, to be fed again to the same work region and/or to a further work region of the surface treatment device.

It may be advantageous if the gas stream that is guided through the work region is guided in a circular flow. The gas stream that is guided through the work region is in that case preferably a circulating air stream.

It may be advantageous if, in a treatment operation of the surface treatment device, in which workpieces are treated, the solvent separating device is in the rest condition.

It may further be provided, in a rest operation of the surface treatment device, in which no workpieces are treated, for the solvent separating device to be in the separating condition, in which the solvent separating device separates solvent off from the gas stream that is guided through the work region.

In an embodiment of the invention, it is provided for the gas stream that is guided through the work region and/or that is to be fed to the same work region or a further work region to be conditioned in respect of its air humidity and/or in respect of its temperature in a rest operation of the surface treatment device, in which no workpieces are treated, before and/or after the gas stream is fed to the solvent separating device.

The surface treatment device according to the invention preferably has a control device by means of which the surface treatment device is controllable in a closed and/or open loop control system such that it is possible for individual or a plurality of method steps of the method according to the invention to be carried out by means of the surface treatment device.

The surface treatment device is in particular suitable for carrying out the method according to the invention.

Further, the surface treatment device according to the invention and/or the method according to the invention for operating a surface treatment device may have individual or a plurality of the features and/or advantages described below:

A work region may be an automated work region in which no persons are present during the treatment operation of the surface treatment device. In particular, it may be provided for the surface treatment device to include at least one automated work region for coating, drying, monitoring and/or post-treating the workpieces.

A work region may further be a manual work region in which at least one person is present during the treatment operation of the surface treatment device. In particular, it may be provided for the surface treatment device to include at least one manual work region for coating, drying, monitoring and/or post-treating the workpieces.

Preferably, the surface treatment device enables a circulating air operation, with the result that a circulating air stream guided therein is usable a plurality of times.

Because the gas stream is guided through the work region, the gas stream takes up solvent in particular. As a result of guiding the gas stream through the work region a plurality of times, the solvent may become concentrated, for example to at least approximately 300 mg/m$^3$, in particular at least approximately 1 g/m$^3$, but at most approximately 2 g/m$^3$, in particular at most approximately 1.5 g/m$^3$.

The concentration of solvent in the gas stream guided through the work region is in particular a function of the ratio of the volume of flow of the intake air to the volume of flow of the circulating air. Further, it is possible for entrainment losses from the workpieces, in particular the vehicle bodies, to affect the concentration of the solvent in the gas stream.

For persons to be allowed access to a work region, legal provisions stipulate that the total concentration of volatile organic hydrocarbons (volatile organic compounds, VOCs) must be less than 50 ppm. In principle, this may be made possible by an increased feed of intake air. However, this can have a negative effect on the temperature and air humidity in the work region. The necessary process parameters for carrying out treatment procedures—that is to say for achieving the treatment operation of the surface treatment device—can then only be maintained in a highly complex manner and/or with a time delay. By contrast, a temporary storage of solvent in the solvent separating device preferably enables rapid access to the work region and/or rapid re-establishment of the process parameters that are necessary for carrying out the treatment operation of the surface treatment device.

Preferably, the solvent separating device can be regenerated in the treatment operation of the surface treatment device, for example in that intake air is guided through the solvent separating device and takes up solvent.

Preferably, the regeneration of the solvent separating device is performed under ambient conditions. As a result of this, the regeneration can be performed over a long period, with the result that the intake air to be fed to the work region has only a small concentration of solvent. In a modified exemplary embodiment, a separate thermal exhaust gas purification unit (TAR) or other heating apparatus is provided for connection as needed.

The solvent content in a circulating air stream is preferably kept at a very low level. As a result, a volume of flow of the circulating air gas stream can preferably be increased in relation to the volume of flow of the exhaust air gas stream. This can in turn enable energy savings.

By achieving a low solvent content in the circulating air stream, the times to access to the work region are preferably shortened, in particular by comparison with a circulating air stream having a higher solvent content. Further, as a result of this, odour nuisance in the environment, in particular in adjacent working areas, which arises from leaks in the system, for example from ducts, intake air systems, plenum, etc., can be reduced. As a result of this too, the burden on components, for example seals, plastics parts, etc., as a result of constant cleaning can be minimised.

The use of heat recovery devices, in particular for recovering heat from the exhaust air, in particular the residual outgoing air, is preferably enabled.

The solvent separating device may for example include a cooling trap.

In particular if the solvent separating device includes a cooling trap, but also as an alternative thereto, it may be provided for the solvent separating device to include a thermal exhaust air purification means (TAR) and/or a catalytic oxidation device. Preferably, a catalytic oxidation device operates approximately at ambient temperature, in particular at a lower temperature than a thermal exhaust air purification means (TAR). In particular, this temperature is below 200° C.

It may be provided for the surface treatment device to include a bypass device. For example, it may be provided, during the treatment operation of the surface treatment device, for at least a portion of the gas stream, in particular a portion of more than 50%, to be guided through the bypass device. In a rest operation of the surface treatment device, during which persons are to be given access to the work region, the gas stream that is guided through the work region, in particular the circulating air stream, may be guided through the solvent separating device instead of through the bypass device and in so doing be cleaned by means of the solvent separating device, in particular being substantially freed of solvent.

The solvent separating device is preferably regenerated by feeding of a gas stream, for example an intake air stream, a portion of a gas stream that is guided in a circular flow (circulating air stream) and/or an exhaust air stream to the solvent separating device.

It is further preferably also possible for the solvent separating device to be regenerated during stoppages in treatment and stoppages for maintenance and/or cleaning.

Further preferred features and/or advantages of the invention form the subject-matter of the description below and the illustration in the drawings of exemplary embodiments.

DETAILED DESCRIPTION OF THE DISCLOSURE

Figure 1:
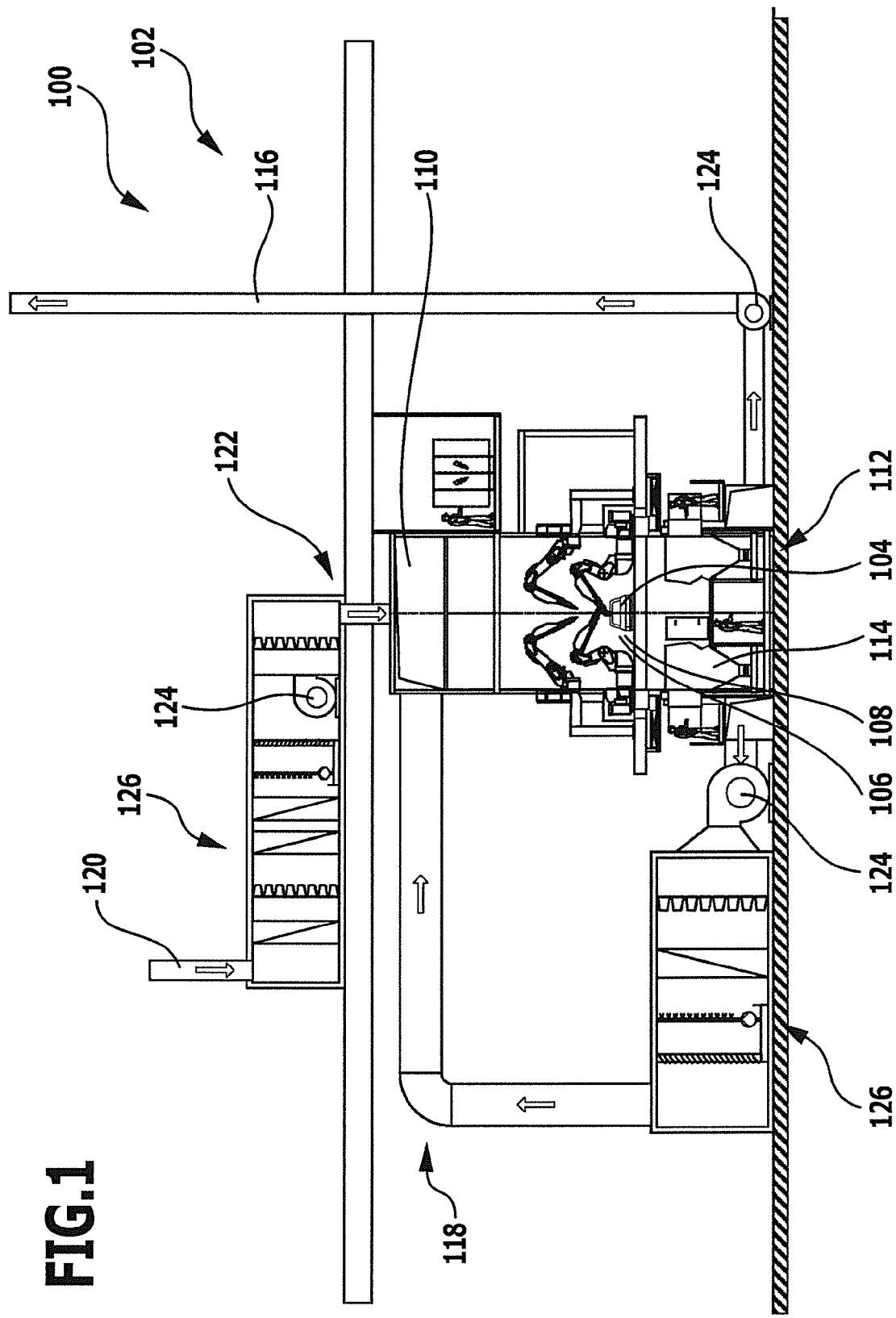
FIG. 1 shows a schematic vertical sectional illustration of a first embodiment of a surface treatment device, in which no exhaust air purification is provided.

Like or functionally equivalent elements are provided with the same reference numerals in all the Figures.

A surface treatment device which is illustrated in FIG. 1 and is designated 100 as a whole takes the form, for example, of a coating plant 102 for coating workpieces 104, in particular vehicle bodies.

To this end, the surface treatment device 100 includes a work region 108 which takes the form of a coating region 106 and to which the workpieces 104 are feedable for coating thereof.

During a treatment operation of the surface treatment device 100, in which workpieces 104 are treated, in particular being coated, a gas stream, in particular an air stream, flows through this work region 108.

In so doing, the gas stream flows through the work region 108 in the direction of gravity, downwards from above.

The gas stream is fed to the work region 108 through a plenum 110 which is arranged above the work region 108.

Below the work region 108 there is arranged a filter system 112 by means of which the gas stream that is guided through the working region 108 can be cleaned of coating overspray particles that occur during the treatment operation.

To this end, the filter system 112 includes in particular regenerative filter devices in which auxiliary filter material is fed to the gas stream to be cleaned. The coating overspray particles are then separated off, together with the auxiliary filter material, at filter elements of the filter devices.

The filter system 112 thus includes in particular particle separating devices 114 for separating off particles, in particular coating overspray particles.

In the first embodiment of the surface treatment device 100 which is illustrated in FIG. 1, at least part of the gas stream that is cleaned by means of the filter system 112 may be released into the environment of the surface treatment device 100 by means of an exhaust air device 116.

Further, it may be provided for at least part of the gas stream that is cleaned by means of the filter system 112 to be guided in a circular flow by means of a circulating air guide 118, and to be fed to the work region 108 again.

Preferably, in all cases a portion of the gas stream that is guided through the work region 108 is guided away by means of the exhaust air device 116 and a portion of the gas stream that is guided through the work region 108 is fed to the work region 108 again by means of the circulating air guide 118.

In order to replace the portion of the gas stream that is guided away through the exhaust air device 116, the surface treatment device 100 includes an intake air device 120.

Intake air, in particular fresh air, may be fed to the work region 108 by means of the intake air device 120.

The intake air device 120, the circulating air guide 118 and the exhaust air device 116 are components of a flow guiding device 122 of the surface treatment device 100.

To drive the gas streams in the flow guiding device 122, in particular the gas stream that is guided through the work region 108, a circulating air stream that is guided in the circulating air guide 118, an exhaust gas stream that is guided away through the exhaust gas device 116 and an intake air stream that is fed by means of the intake air device 120, the flow guiding device 122 includes a plurality of ventilators 124.

Further, the surface treatment device 100 includes two conditioning devices 126.

A conditioning device 126 is preferably associated with the intake air device 120 in such a way that the intake air stream to be fed to the work region 108 can be conditioned in particular in respect of its moisture and temperature.

A further conditioning device 126 is associated with the circulating air guide 118 in such a way that the circulating air stream can be conditioned in respect of moisture and temperature before being fed to the work region 108.

The surface treatment device 100 that is described above operates as follows:

By means of a conveyor device (not illustrated), workpieces 104, in particular vehicle bodies, are introduced into the work region 108 and are coated there.

During the coating procedure, the air in the work region 108 takes up coating overspray particles.

To prevent undesired contamination of the work region 108 and/or the workpieces 104 with coating overspray, the air in the work region 108 is guided away. In particular, a gas stream is guided through the work region 108.

The gas stream that is guided through the work region 108 is a mixture of an intake air stream that is fed in by means of the intake air device 120 and has been conditioned by means of the conditioning device 126 of the intake air device 120, and a circulating air stream that has already been guided through the work region 108 previously and has been cleaned by means of the filter system 112 and conditioned by means of the conditioning device 126 of the circulating air guide 118.

A portion of the gas stream that is guided through the work region 108 is guided away through the exhaust gas device 116, as exhaust gas stream.

By using a circulating air guide 118, the surface treatment device 100 can be operated with little expenditure of energy.

Figure 2:
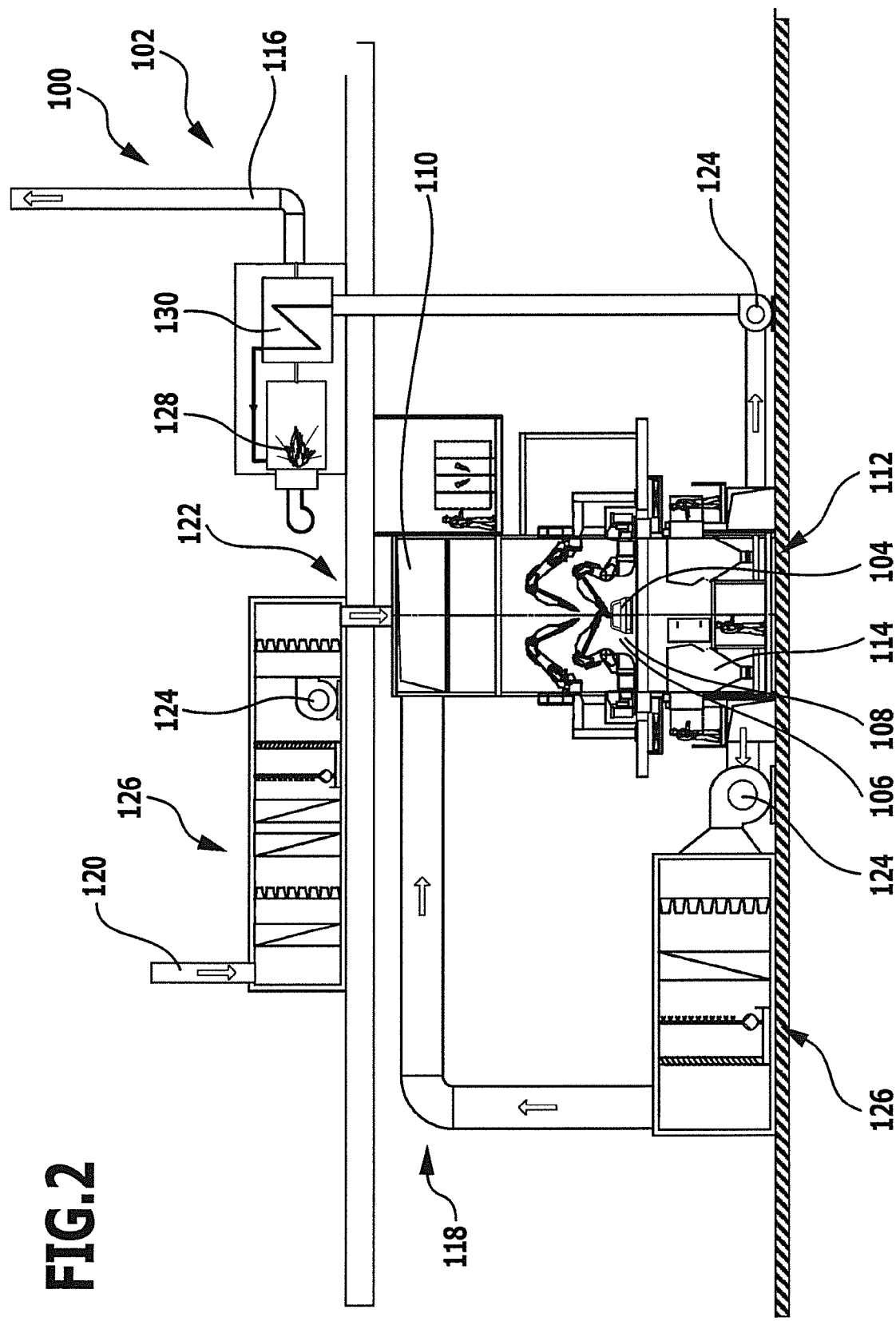
FIG. 2 shows a schematic illustration corresponding to FIG. 1, of a second embodiment of a surface treatment device, in which a thermal exhaust air purification device is provided for cleaning the exhaust air.

A second embodiment, illustrated in FIG. 2, of a surface treatment device 100 differs from the first embodiment, illustrated in FIG. 1, substantially in that a thermal exhaust air purification device 128 is associated with the exhaust air device 116.

By means of the thermal exhaust air purification device 128, it is possible to render harmless solvents which are released in particular during the treatment operation of the surface treatment device 100, are taken up by the gas stream that is guided through the work region 108 and cannot be removed from the gas stream using the filter system 112, in particular converting them by chemical reaction into substances which are harmless to health.

The exhaust air device 116 of the surface treatment device 100 according to the second embodiment, illustrated in FIG. 2, further includes a heat exchanger 130. By means of the heat exchanger 130, heat which arises during operation of the thermal exhaust air purification device 128 can be transmitted to the exhaust air stream before the exhaust air stream is fed to the thermal exhaust air purification device.

Because the second embodiment of the surface treatment device 100 includes a thermal exhaust air purification device 128, the surface treatment device 100 can be operated in a particularly environmentally friendly manner.

Otherwise, the second embodiment, illustrated in FIG. 2, of the surface treatment device 100 matches the first embodiment, illustrated in FIG. 1, in terms of structure and function, so reference is made to the description above thereof in this respect.

Figure 3:
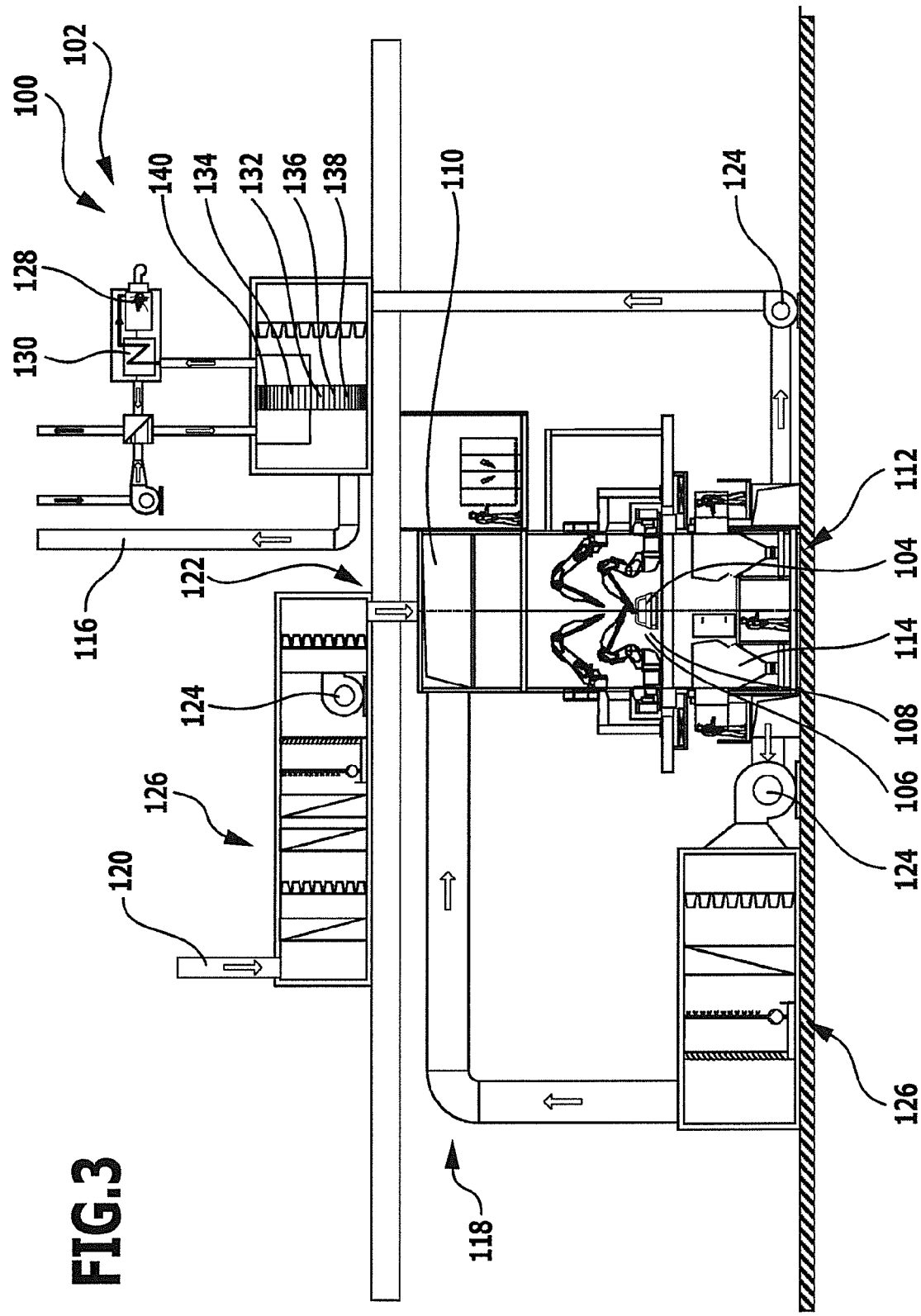
FIG. 3 shows a schematic illustration corresponding to FIG. 1, of a third embodiment of a surface treatment device, which includes a thermal exhaust air purification device and a carbon fibre paper rotor device for cleaning the exhaust air.

A third embodiment, illustrated in FIG. 3, of the surface treatment device 100 differs from the second embodiment, illustrated in FIG. 2, substantially in that in addition to the thermal exhaust air purification device 128 and the heat exchanger 130 a processing device 132 for processing the exhaust air stream that contains solvent is provided.

Preferably, the processing device 132 is a carbon fibre paper rotor device.

The processing device 132 includes a rotary device 134 for rotating a separation element 136.

Exhaust air that contains solvent may flow through the separation element 136 for example in a lower region 138, in respect of the direction of gravity, as a result of which the solvent is separated off from the exhaust air.

The separation element 136 is regenerated for example in an upper region 140 of the separation element 136, in respect of the direction of gravity.

To this end, heated air, in particular fresh air that has been heated by means of the thermal exhaust air purification device 128 and a heat exchanger 130, is fed to the upper region 140 of the separation element 136 such that the solvent contained in the separation element 136 is released.

The air stream that is guided through the separation element 136 and is loaded with solvent is then fed to the thermal exhaust air purification device 128 such that the solvent contained therein undergoes thermal conversion and is thereby rendered harmless.

The separation element 136 may be rotated by means of the rotation device 134 as required. As a result of this, the initially lower region 138 becomes the upper region 140, while the initially upper region 140 becomes the lower region 138. As a result of this, continuous exhaust air purification is possible by means of the processing device 132.

Otherwise, the third embodiment, illustrated in FIG. 3, of the surface treatment device matches the second embodiment, illustrated in FIG. 2, in terms of structure and function, so reference is made to the description above thereof in this respect.

Figure 4:
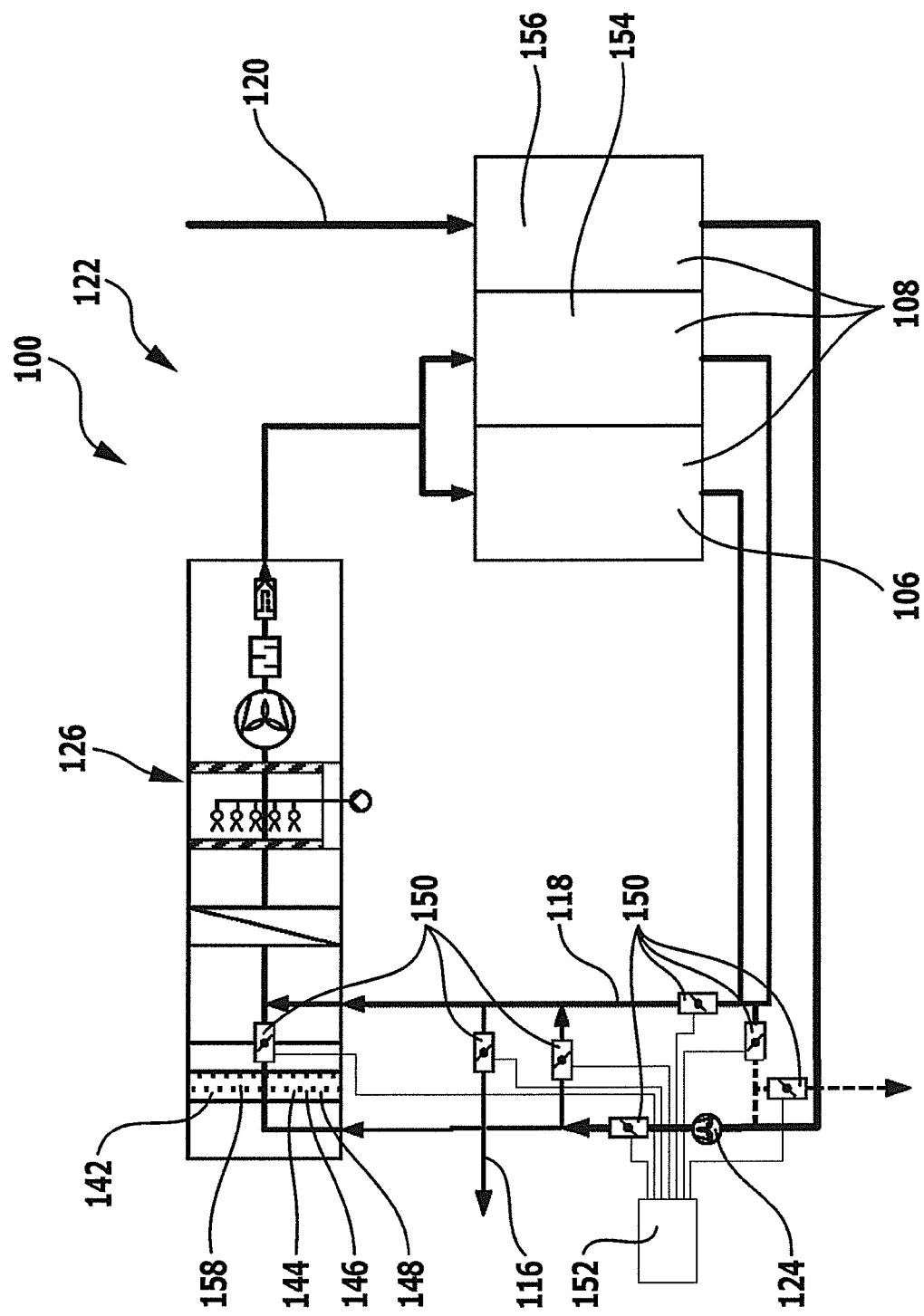
FIG. 4 shows a schematic illustration of a fourth embodiment of a surface treatment device, in which a solvent separating device is arranged upstream of a conditioning device, wherein the surface treatment device is in a treatment operation.

A fourth embodiment, illustrated in FIG. 4, of a surface treatment device 100 differs from the first embodiment, illustrated in FIG. 1, substantially in that three work regions 108 are provided and the surface treatment device 100 includes a solvent separating device 142.

The solvent separating device 142 includes for example an adsorption device 144 for adsorbing solvent, a condensation device 146 for condensing out solvents, and/or a combustion device 148 for the thermal conversion of solvent.

In the fourth embodiment, illustrated in FIG. 4, of the surface treatment device 100, the flow guiding device 122 includes a plurality of valves 150 for controlling gas streams in a closed and/or open loop system.

Here, the term "valves 150" should be understood also to include flaps or other devices by means of which a volume of flow and/or a flow direction of a gas stream may be influenced in a specific manner.

For directed control of the valves 150 in a closed and/or open loop system, a control device 152 of the surface treatment device 100 is provided.

FIG. 4 illustrates the surface treatment device 100 during a treatment operation in which workpieces 104 are treated.

To this end, the surface treatment device 100 includes a work region 108 that takes the form of a coating region 106, a work region 108 that takes the form of a drying region 154 and a work region 108 that takes the form of a monitoring region 156.

By means of a conveyor device (not illustrated), the workpieces 104 are conveyed one after the other through the coating region 106, the drying region 154 and the monitoring region 156.

During the treatment operation of the surface treatment device 100, the valves 150 are triggered and arranged such that, by means of the intake air device 120, intake air may be fed to the monitoring region 156, guided through the monitoring region 156 and fed to the solvent separating device 142.

The intake air that is guided through the solvent separating device 142 is fed to the circulating air stream that is guided in the circulating air guide 118.

Here, the circulating air stream is a gas stream which is guided through the work regions 108, in particular the coating region 106 and the drying region 154.

In so doing, the circulating air stream can be conditioned by means of the conditioning device 126 in respect of its moisture and temperature.

By means of the exhaust air device 116, it is further possible for exhaust air to be guided away out of the circulating air guide 118.

During the treatment operation, illustrated in FIG. 4, of the surface treatment device 100, the circulating air stream that is guided in the circulating air guide 118 is guided past the solvent separating device 142.

The solvent separating device 142 is thus in a rest condition, in which no solvent is separated off by means of the solvent separating device 142 from the gas stream that is guided through the work regions 108.

Only solvents that are in the intake air stream are separated off by means of the solvent separating device 142.

Because the intake air stream flows continuously through the solvent separating device 142, however, whenever the solvent content in the intake air stream is below the saturation concentration specific to the temperature and substance concerned, solvents in the solvent separating device 142 are taken up by the intake air stream and fed to the circulating air stream, in particular the gas stream that is guided through the work regions 108.

During the treatment operation of the surface treatment device 100, the concentration of solvent in the circulating air stream increases over time. However, as a result of the continuous feeding in of intake air and the continuous guiding away of exhaust air, an equilibrium condition is preferably established, with a substantially constant concentration of solvent in the circulating air stream.

In particular when the coating region 106 and/or the drying region 154 are to be made accessible to persons, the concentration of solvent in these work regions 108 must be sharply reduced.

Figure 5:
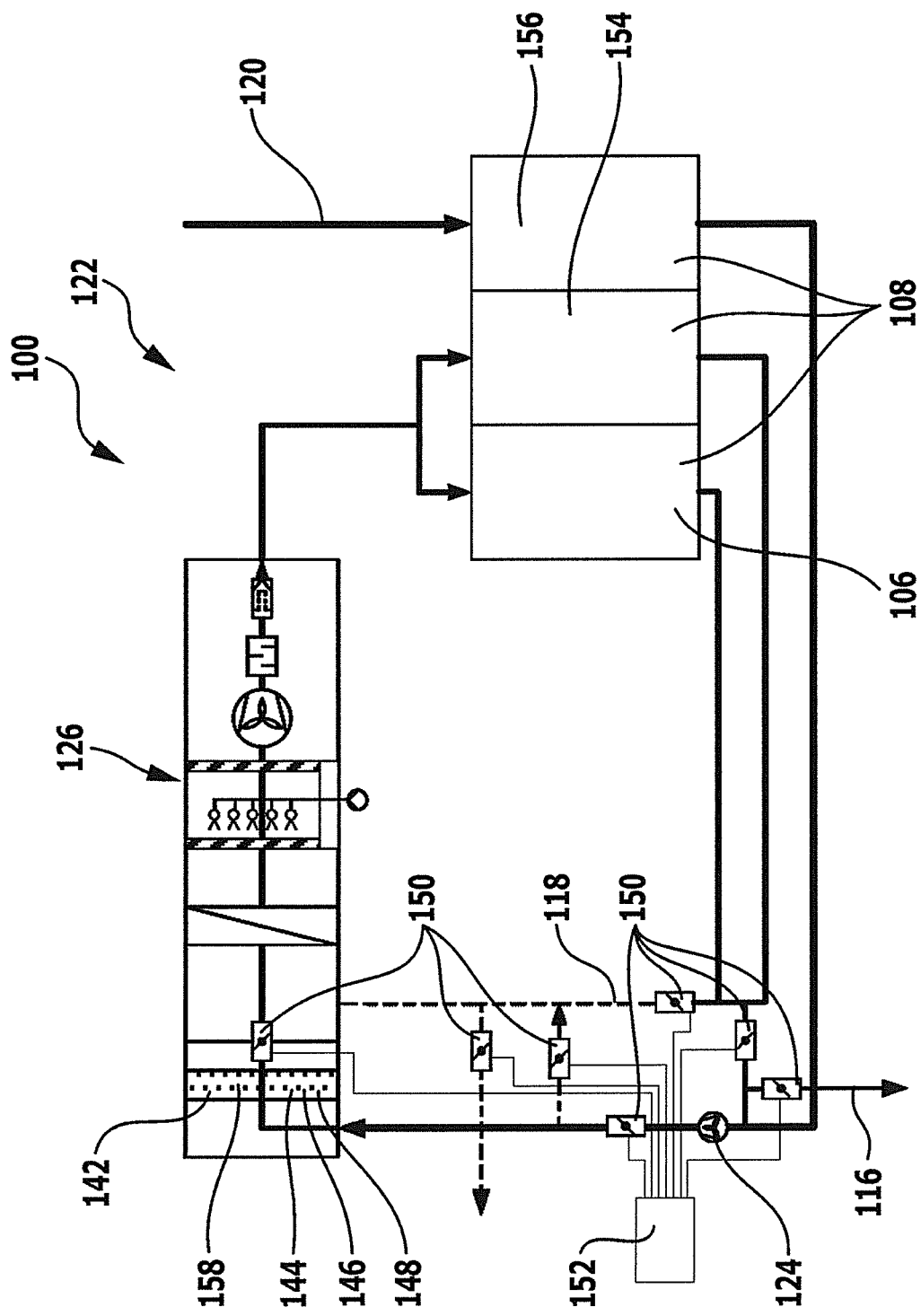
FIG. 5 shows a schematic illustration corresponding to FIG. 4, of the fourth embodiment of the surface treatment device, wherein the surface treatment device is in a rest operation.

To this end, the surface treatment device 100 can be put into the rest operation, illustrated in FIG. 5.

In this rest operation of the surface treatment device 100, both the intake air stream and the circulating air stream flow through the solvent separating device 142.

Solvents in the gas stream that is guided through the work regions 108 are in this case separated off by means of the solvent separating device 142, such that the concentration of solvent in the gas stream that is guided through the work regions 108, in particular the circulating air stream, can be sharply reduced within a short time.

Thus, in the rest operation of the surface treatment device 100 the solvent separating device 142 is in the separating condition.

With a surface treatment device 100 that has a circulating air motion comprising 10 to 20% fresh air and exhaust air portion and using the solvent separating device 142, in particular this allows the coating region 106 and the drying region 154 to be made accessible to persons in a shorter time than with a surface treatment device 100 that has a circulating air motion comprising 10 to 20% fresh air and exhaust air portion without the solvent separating device 142. Preferably, access is possible after up to 80% of the time, particularly preferably after up to 50% of the time.

As a result of this, a burdensome procedure of flushing the work regions 108 with fresh air and the burdensome disposal of the circulating air stream that contains solvent can preferably be avoided.

The fourth embodiment, illustrated in FIGS. 4 and 5, of the surface treatment device 100 may further be restored to the treatment operation in a particularly simple manner by suitable control of the valves 150.

The solvent that is taken up in the solvent separating device 142 is then released, in the treatment operation, into the gas stream to be fed to the work regions 108 by means of the intake air that is guided through the solvent separating device 142.

In this way, the gas stream to be fed to the work regions 108 and thus also the circulating air stream re-attain the process parameters prevailing in the treatment operation particularly quickly, and in particular this enables the solvent content in the circulating air stream to be brought into the equilibrium condition particularly quickly.

By means of the solvent separating device 142, in the fourth embodiment, illustrated in FIGS. 4 and 5, of the surface treatment device 100 solvent can thus be put into temporary storage in order to make the work regions 108 accessible quickly.

The solvent separating device 142 is thus a solvent temporary storage device 158.

In particular, by means of a solvent temporary storage device 158 of this kind, the clearance time of the work regions 108, until which it is possible to give persons access, may be sharply reduced.

In the fourth embodiment, illustrated in FIGS. 4 and 5, of the surface treatment device 100, in the rest operation of the surface treatment device 100 the solvent separating device 142 is arranged upstream, as seen in the direction of flow, of a conditioning device 126 for conditioning the circulating air stream. Thus, in the rest operation of the surface treatment device 100 the intake air stream is guided, together with the circulating air stream, first through the solvent separating device 142 and then through the conditioning device 126.

Further, in the fourth embodiment of the surface treatment device 100, it may be provided, in the treatment operation of the surface treatment device 100, for the intake air stream to be fed partly to the solvent separating device 142 and partly directly to the circulating air guide 118.

Otherwise, the fourth embodiment, illustrated in FIGS. 4 and 5, of the surface treatment device 100 matches the first embodiment, illustrated in FIG. 1, in terms of structure and function, so reference is made to the description above thereof in this respect.

Figure 6:
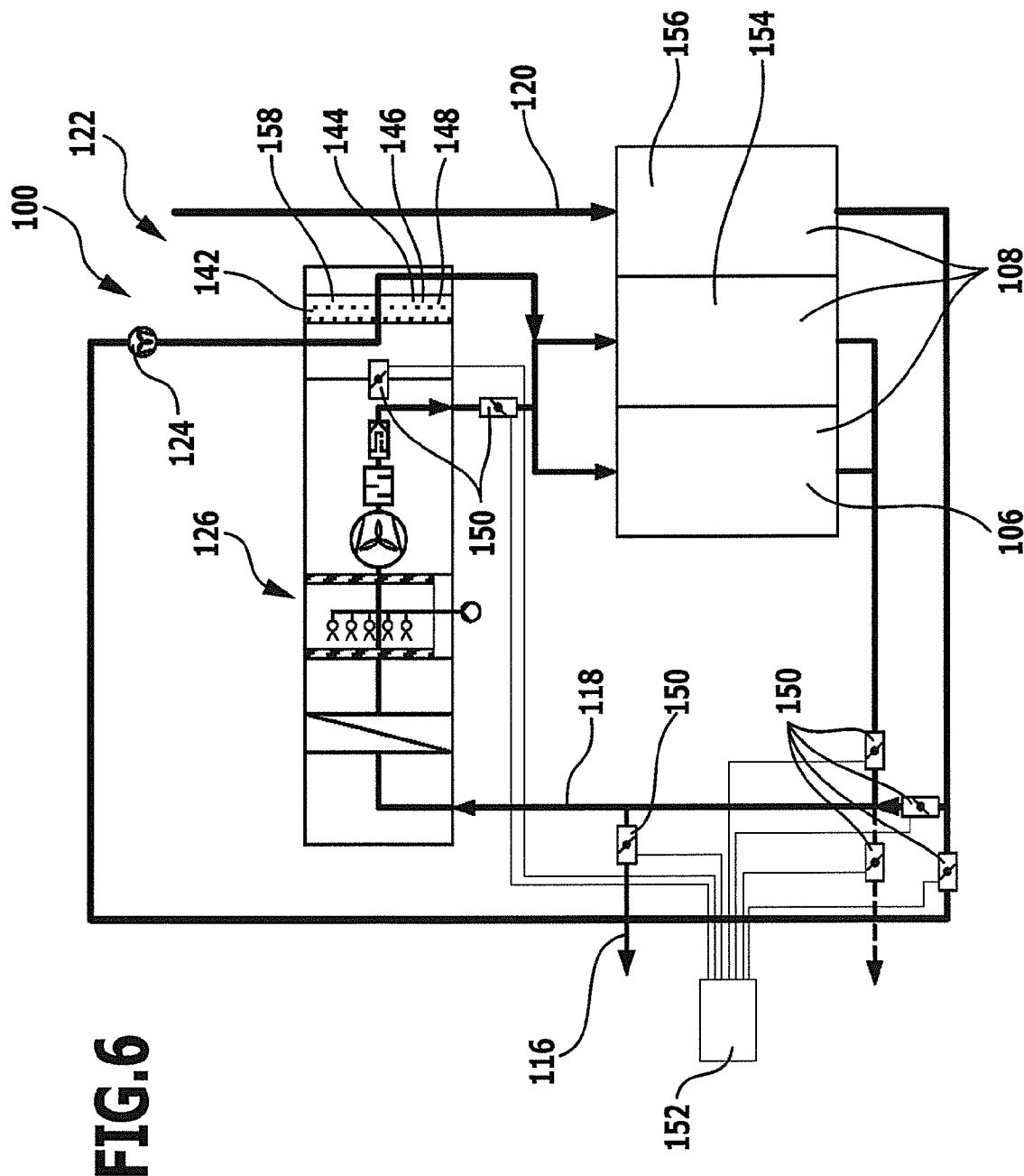
FIG. 6 shows a schematic illustration corresponding to FIG. 4, of a fifth embodiment of a surface treatment device, in which a solvent separating device is arranged downstream of a conditioning device, wherein the surface treatment device is in a treatment operation.
Figure 7:
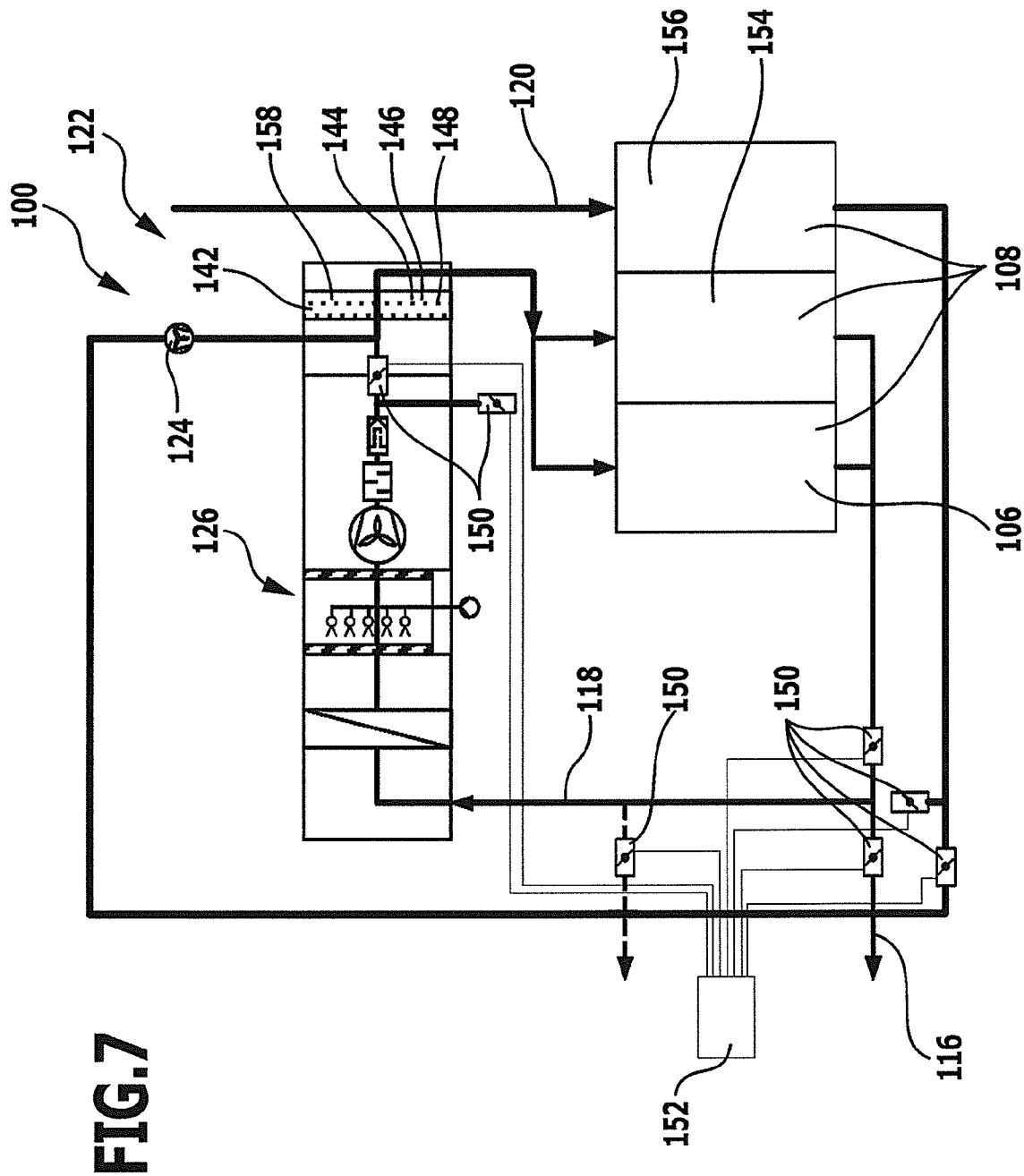
FIG. 7 shows a schematic illustration corresponding to FIG. 6, of the fifth embodiment of the surface treatment device, wherein the surface treatment device is in a rest operation.

A fifth embodiment, illustrated in FIGS. 6 and 7, of a surface treatment device 100 differs from the fourth embodiment, illustrated in FIGS. 4 and 5, substantially in that, in the rest operation of the surface treatment device 100, the solvent separating device 142 is arranged downstream, as seen in a direction of flow of the circulating air stream, of the conditioning device 126 for conditioning the circulating air stream.

The intake air that is fed by means of the intake air device 120 is in this case fed to the gas stream that is guided in the circulating air guide 118 between the conditioning device 126 for the circulating air and the solvent separating device 142, when the surface treatment device 100 is in the rest operation (see FIG. 7).

In the case of the fifth embodiment, illustrated in FIGS. 6 and 7, of the surface treatment device 100, the intake air that is fed by means of the intake air device 120 is not conditioned by means of the conditioning device 126 for the circulating air, either in the treatment operation or in the rest operation.

Otherwise, the fifth embodiment, illustrated in FIGS. 6 and 7, of the surface treatment device 100 matches the fourth embodiment, illustrated in FIGS. 4 and 5, in terms of structure and function, so reference is made to the description above thereof in this respect.

Figure 8:
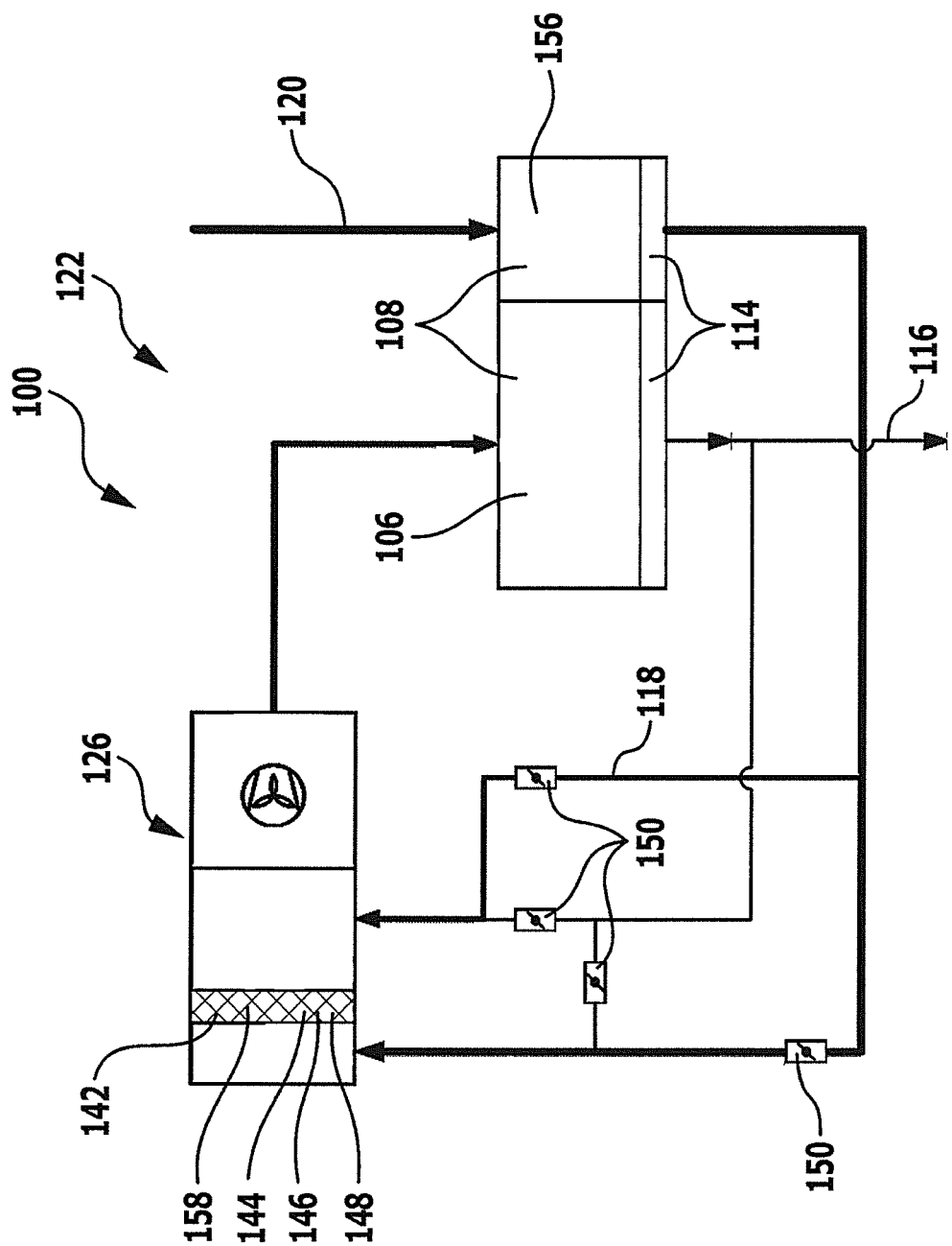
FIG. 8 shows a schematic illustration corresponding to FIG. 4, of a sixth embodiment of a surface treatment device, with an alternative flow guiding device.

A sixth embodiment, illustrated in FIG. 8, of a surface treatment device 100 differs from the fourth embodiment, illustrated in FIGS. 4 and 5, substantially in that, in the rest operation, the intake air stream is fed to the circulating air guide 118 downstream of the solvent separating device 142 and hence past the solvent separating device 142.

In this case, the volume of flow or mass flow of the air loaded with solvent which is guided through the solvent separating device 142 can be controlled in a closed and/or open loop system in a directed manner by way of the position of the valves 150. The intake air that is fed by means of the intake air device 120, in particular fresh air, does not then result in a dilution of the gas stream to be guided to the solvent separating device 142, in particular the circulating air stream, in the rest operation of the surface treatment device 100. As a result, the residence time in the solvent separating device 142 of the gas stream that is loaded with solvent is lengthened and the separating procedure is made more efficient.

Preferably, the exhaust air stream is guided away out of the circulating air guide 118 downstream of a particle separating device 114.

Otherwise, the sixth embodiment, illustrated in FIG. 8, of the surface treatment device 100 matches the fourth embodiment, illustrated in FIGS. 4 and 5, in terms of structure and function, so reference is made to the description above thereof in this respect.

In further embodiments (not illustrated), it may be provided for individual or a plurality of features of the embodiments described above to be combined with one another. For example, the fourth embodiment according to FIGS. 4 and 5 may be provided with a thermal exhaust air purification device 128 according to the second embodiment, illustrated in FIG. 2, of the surface treatment device 100.

As a result of using a solvent separating device 142 which is configured to be put selectively in a separating condition or a rest condition, solvent may selectively be separated off from the gas stream that is guided through the work region 108 or preferably released thereto. As a result, the surface treatment device 100 is operable simply and safely.

The invention claimed is:

1. A surface treatment device for treating a surface of a workpiece, including:
   a work region in which the surface of the workpiece is treatable;
   a flow guiding device by means of which a gas stream is guidable through the work region;
   a solvent separating device for separating off solvent from the gas stream that is guided through the work region, wherein the solvent separating device is configured to be put selectively in a separating condition or in a rest condition, wherein, in the separating condition, the solvent separating device separates off solvent from the gas stream,
   wherein by means of an intake air device of the surface treatment device, an intake air stream is feedable to the flow guiding device, and
   wherein by means of the solvent separating device, solvent is releasable into at least one of the intake air stream or a circulating air stream that is guided through the work region.

2. The surface treatment device according to claim 1, wherein the gas stream is feedable again by means of the flow guiding device to the same work region and/or to a further work region of the surface treatment device.

3. The surface treatment device according to claim 1, wherein the surface treatment device includes a particle separating device which takes the form of a regenerable filter device, for separating off particles from a gas stream that is guided through a work region and is loaded with particles.

4. The surface treatment device according to claim 1, wherein the surface treatment device includes a control device by means of which the surface treatment device is selectively operable in a treatment operation, in which workpieces are treated, or in a rest operation, in which no workpieces are treated,
   wherein, in the treatment operation of the surface treatment device, the solvent separating device is in the rest condition, and
   wherein, in the rest condition of the surface treatment device, the solvent separating device is in the separating condition, with the result that the solvent separating device separates solvent off from the gas stream that is guided through the work region.

5. The surface treatment device according to claim 1, wherein the solvent separating device is a solvent temporary storage device by means of which solvent which, in a treatment operation of the surface treatment device, is contained in a gas stream that is to be fed to a work region is separable from the gas stream in a rest condition of the surface treatment device.

6. The surface treatment device according to claim 1, wherein the solvent separating device is a solvent temporary storage device by means of which solvent which, in a rest operation of the surface treatment device, is taken up in the solvent separating device is releasable into a gas stream that is to be fed to a work region in a treatment operation of the surface treatment device.

7. The surface treatment device according to claim 1, wherein the solvent separating device includes an adsorption device for the adsorption of solvent, a condensation device for condensing out solvent and/or a combustion device for the thermal conversion of solvent.

8. The surface treatment device according to claim 1, wherein the work region is a coating region, a drying region and/or a monitoring region for coating, drying, monitoring and/or post-treatment of workpieces.

9. The surface treatment device according to claim 1, wherein the surface treatment device includes a conditioning device by means of which an intake air stream and/or a gas stream that is guided through a work region are conditionable before being fed to a work region.

10. A method for operating a surface treatment device, wherein:
    a surface of a workpiece is treated in a work region of the surface treatment device;
    a gas stream is guided through the work region;
    a solvent separating device for separating solvent off from the gas stream that is guided through the work region is selectively put in a separating condition or in a rest condition,
    wherein, in the separating condition, the solvent separating device separates off solvent from the gas stream,
    wherein by means of an intake air device of the surface treatment device, an intake air stream is feedable to the flow guiding device, and
    wherein by means of the solvent separating device, solvent is releasable into at least one of the intake air stream or a circulating air stream that is guided through the work region.

11. The method according to claim 10, wherein the gas stream that is guided through the work region is fed again to the same work region or to a further work region of the surface treatment device.

12. The method according to claim 10, wherein, in a treatment operation of the surface treatment device, in which workpieces are treated, the solvent separating device is in the rest condition.

13. The method according to claim 10, wherein, in a rest operation of the surface treatment device, in which no workpieces are treated, the solvent separating device is in the separating condition, in which the solvent separating device separates solvent off from the gas stream that is guided through the work region.

14. The method according to claim 10, wherein the gas stream that is guided through the work region and/or that is to be fed to the same work region or a further work region is conditioned in respect of its air humidity and/or in respect of its temperature in a rest operation of the surface treatment device, in which no workpieces are treated, before and/or after the gas stream is fed to the solvent separating device.

* * * * *